US011431276B2

(12) United States Patent
Schroeder et al.

(10) Patent No.: US 11,431,276 B2
(45) Date of Patent: Aug. 30, 2022

(54) METHOD FOR OPERATING A BRUSHLESS ELECTRIC MOTOR OF A MOTOR VEHICLE

(71) Applicant: Brose Fahrzeugteile GmbH & Co. Kommanditgesellschaft, Würzburg, Würzburg (DE)

(72) Inventors: Hans-Joachim Schroeder, Wiesbaden (DE); Axel Steinshorn, Wittighausen (DE); Armin Dietz, Rückersdorf (DE)

(73) Assignee: Brose Fahrzeugteile GmbH & Co. Kommanditgesellschaft, Würzburg, Wurzburg (DE)

( * ) Notice: Subject to any disclaimer, the term of this patent is extended or adjusted under 35 U.S.C. 154(b) by 615 days.

(21) Appl. No.: 16/462,763

(22) PCT Filed: Nov. 22, 2017

(86) PCT No.: PCT/EP2017/079999
§ 371 (c)(1),
(2) Date: May 21, 2019

(87) PCT Pub. No.: WO2018/095946
PCT Pub. Date: May 31, 2018

(65) Prior Publication Data
US 2020/0067446 A1   Feb. 27, 2020

(30) Foreign Application Priority Data

Nov. 24, 2016 (DE) .......................... 102016223349.1

(51) Int. Cl.
*H02P 29/40* (2016.01)
*H02K 7/00* (2006.01)
(Continued)

(52) U.S. Cl.
CPC ......... *H02P 29/40* (2016.02); *B60H 1/00428* (2013.01); *B60H 1/3205* (2013.01); *H02K 7/006* (2013.01)

(58) Field of Classification Search
CPC ...................................... H02M 7/493
(Continued)

(56) References Cited

U.S. PATENT DOCUMENTS 6,392,905 B1 * 5/2002 Huang .................. H02M 7/493
363/71
7,224,079 B2 * 5/2007 Kanazawa ............ H02J 7/1492
290/40 B (Continued)

FOREIGN PATENT DOCUMENTS

| DE | 10346060 A1 | 5/2005 |
| DE | 102005043576 A1 | 3/2007 |
| DE | 102010001705 A1 | 8/2011 |

*Primary Examiner* — Nelson J Nieves
*Assistant Examiner* — Meraj A Shaikh
(74) *Attorney, Agent, or Firm* — Brooks Kushman P.C.

(57) ABSTRACT

A method for operating a brushless electric motor of a motor vehicle, particularly an electromotive refrigerant compressor, with two sub-motors arranged in sections and each comprising n-phases, by means of a converter corresponding to the number of phases of the electric motor. On the basis of a performance requirement, first switching points are determined for the n-phases, of one of the sub-motors, and on the basis of the performance requirement, second switching points are determined for the n-phases of the other sub-motor. The second switching points are shifted by a first phase angle and the converter is controlled on the basis of the first switching points and the second switching points. The first phase angle is selected such that a resulting current flow over the converter is smaller than a first threshold value. A unit of a motor vehicle, comprising a brushless electric motor is also disclosed.

20 Claims, 9 Drawing Sheets

(51) Int. Cl.
  *B60H 1/00* (2006.01)
  *B60H 1/32* (2006.01)
(58) Field of Classification Search
  USPC .................................................. 318/254, 432
  See application file for complete search history.

(56) References Cited

U.S. PATENT DOCUMENTS

| | | |
|---|---|---|
| 8,717,788 B2 | 5/2014 | Chen et al. |
| 2005/0184689 A1* | 8/2005 | Maslov .................... B60L 8/00 318/400.41 |
| 2005/0225270 A1 | 10/2005 | Schnetzka et al. |
| 2014/0361613 A1 | 12/2014 | Huang et al. |

* cited by examiner

METHOD FOR OPERATING A BRUSHLESS ELECTRIC MOTOR OF A MOTOR VEHICLE

CROSS-REFERENCE TO RELATED APPLICATIONS

This application is the U.S. National Phase of PCT Application No. PCT/EP2017/079999 filed on Nov. 22, 2017, which claims priority to German Patent Application No. DE 10 2016 223 349.1, filed on Nov. 24, 2016, the disclosures of which are incorporated in their entirety be reference herein.

TECHNICAL FIELD

The present disclosure relates to a method for operating a brushless electric motor of a motor vehicle. The electric motor is may be a constituent part of an electromotive refrigerant compressor. The present disclosure further relates to a unit of a motor vehicle, such as an electromotive refrigerant compressor.

BACKGROUND

Motor vehicles usually have an air-conditioning system by means of which a temperature of an interior of the motor vehicle can be controlled. In the case of motor vehicles driven by means of an electric motor, the necessary energy stores, such as a high-voltage battery, are also cooled. The air-conditioning system has a refrigerant circuit, which may include a refrigerant compressor, a condenser connected downstream thereof and an evaporator fluidically connected downstream thereof. A further heat exchanger is fluidically connected downstream thereof, said further heat exchanger being in thermal contact with possible energy cells of the high-voltage energy store or with a fan line that leads to the interior of the motor vehicle. The refrigerant circuit is filled with a refrigerant, such as R134a, R1234yf or CO2.

During operation, a pressure of the refrigerant is increased by means of the refrigerant compressor, which leads to an increase in the temperature of the refrigerant. Said refrigerant is conducted to the condenser, which is in thermal contact with the surroundings of the motor vehicle. In this case, the temperature of the refrigerant is lowered, said refrigerant being relieved of pressure back to the original pressure in the downstream evaporator, for which reason the temperature of the refrigerant is reduced further. In the downstream heat exchanger, thermal energy is transmitted to the refrigerant by the component in thermal contact with the heat exchanger, which leads to cooling of the component and heating of the refrigerant. The heated refrigerant is fed to the refrigerant compressor again in order to close the refrigerant circuit.

In order to adjust the power of the refrigerant compressor depending on a rotational speed of an internal combustion engine of the motor vehicle, said refrigerant compressor has an electric motor, by means of which a compressor head is driven, said compressor head being a scroll compressor head, for example. In other words, the refrigerant compressor is an electromotive refrigerant compressor. The electric motor is usually a brushless electric motor, which is operated by means of a converter. In this case, the electric motor usually has three phases and the converter is configured as what is known as a B6 converter. If the electric motor is operated at comparatively low voltages and/or in the case of a comparatively large power requirement, a comparatively large flow of current across the phases is required. Therefore, all of the electrical and electronic components have to be adapted to the increased flow of current, which leads to increased production costs.

An alternative thereto is the manufacture of the electric motor with a greater number of phases, for example six phases and with a configuration of the electric motor as what is known as a B12 converter. In this case, three phases of the electric motor are combined in each case to form a motor element. In principle, there are two different options of arrangements of the two motor elements with respect to one another. Therefore, said motor elements can either be arranged overlapping so that a rotationally symmetrical design of the entire electric motor is produced. Actuation is simplified in this case an account of the symmetrical design. In addition, no asymmetries result upon actuation and during operation of the electric motor. However, since the individual phases are overlapping, constructing said phases by means of a winding wire is made difficult. In the alternative configuration of the electric motor, the two motor elements are arranged in sections with respect to one another so that each motor element is substantially configured in the shape of a half-moon. As a result thereof, constructing the individual phases of the motor elements by means of winding is made simpler. However, on account of the asymmetrical design, the actuation is made difficult, and asymmetrical flows of current across the converter result, which in turn leads to increased loading.

SUMMARY

The present disclosure aims to provide a particularly suitable method for operating a brushless electric motor of a motor vehicle and a particularly suitable unit of a motor vehicle, such that production costs are reduced and reliability is may be increased.

According to one embodiment, a method of operating a brushless electric motor of a motor vehicle, is provided. The electric motor is, for example, a brushless DC (BLDC) motor. The electric motor may be an expediently a synchronous motor. The brushless electric motor is fittingly a constituent part of a unit of the motor vehicle, in particular an ancillary unit of the motor vehicle and, for example, an adjustment drive. During operation, an adjustment part is moved along an adjustment travel by means of the adjustment drive. For example, the adjustment drive is an electromotive window lifter, an electromotively operated tailgate or an electromotively operated door, such as a sliding door. As an alternative thereto, the adjustment drive is an electromotively operated sunroof or an electromotively operated top. In a further alternative, the ancillary unit is a pump, such as a lubricant pump, for example. In particular, the ancillary unit is an oil pump, for example an engine oil or a transmission oil pump. Expediently, the ancillary unit is an electromotive steering support system or an ABS or ESP unit. In a further alternative, the ancillary unit is an electromotive parking brake or another electrical brake. For example, the ancillary unit is a constituent part of a vehicle seat and serves, in particular, to adjust the seat or a part of the seat, such as a backrest or a headrest.

The brushless electric motor may be a constituent part of an electromotive refrigerant compressor. During operation, a refrigerant is compressed by means of the electromotive refrigerant compressor. The refrigerant is, for example, a chemical refrigerant, such as R134a or R1234yf. Alternatively, the refrigerant is CO2. The electromotive refrigerant compressor may be designed in such a way that the respective refrigerant can be compressed, wherein, for example, a pressure increase between 5 bar and 20 bar takes place. In particular, the electromotive refrigerant compressor may include a compressor head, for example a scroll compressor.

The electromotive refrigerant compressor may be a constituent part of a refrigerant circuit (refrigeration circuit), which serves, for example, for the air conditioning of an interior or for cooling an energy store of the motor vehicle, such as a high-voltage battery. The refrigerant circuit also may include, in particular, an (air-conditioning) condenser, and an evaporator. The condenser is fluidically connected between the electromotive refrigerant compressor and the evaporator. The refrigerant circuit may include a further heat exchanger, which is connected between the evaporator and the electromotive refrigerant compressor and which may be in thermal contact with a further component of the motor vehicle, such as a fan line of an air-conditioning system or an energy store, such as a high-voltage energy store. The refrigerant circuit is filled, in particular, with a refrigerant, for example a chemical refrigerant, such as R134a, R1234yf or with $CO_2$.

During operation, a pressure of the refrigerant is increased by the electromotive refrigerant compressor, said refrigerant being subsequently led to the condenser, which may be in thermal contact with the surroundings of the motor vehicle. The temperature of the refrigerant may be matched to the temperature of the surroundings or the temperature of the refrigerant is at least lowered by the condenser, for example. The refrigerant may be relieved of pressure by way of the downstream evaporator, for which reason the temperature of the refrigerant is reduced further. In the downstream further heat exchanger, thermal energy is transmitted to the refrigerant by the component in thermal contact with the further heat exchanger, which leads to cooling of the component and heating of the refrigerant. The heated refrigerant may be fed to the refrigerant compressor again in order to close the refrigerant circuit.

The electric motor has two motor elements, which are arranged in sections. In other words, each of the motor elements forms a cohesive circumferential section of the electric motor. The motor elements are therefore not overlapping. In particular, the stators of the respective motor elements are arranged in sections, and the motor elements expediently form the stator of the electric motor. For example, the electric motor may include a number of such motor elements that form the stator, such as, for example, three, four, five or more motor elements. The electric motor expediently has only one single rotor, which is associated with the (two) motor elements.

Each of the motor elements has n phases. n phases is understood here to mean, in particular, a specific number of phases per motor element, wherein the number is, in particular, greater than or equal to two (2). For example, the number of phases per motor element is lower than or equal to twelve (12) phases or six (6) phases. For example, the number of phases per motor element is different. In other words, for example, one of the motor elements has two phases and the other motor element has four phases. In summary, n phases denotes only a number of phases, wherein the number of phases can be different over the motor elements. In other words, one of the motor elements has l phases and the other motor has m phases, wherein, in particular, $2 \leq m$, $1 \leq 12$. However, the two motor elements may have the same number of phases and, in particular, the number of phases per motor element is equal to 3. In other words, a 3-phase motor element is associated with each of the motor elements. For example, each of the n phases has a number of electrical coils, in particular two, three, four or more electrical coils. In other words, each of the n phases has a number of electromagnets.

The n phases of each motor element are interconnected with one another, for example, in a star or a delta circuit. For example, the interconnection of the two motor elements is different. However, the n phases of the two motor elements, in particular all of the possible motor elements of the electric motor, may be interconnected with one another in a star circuit. The two star points of the two motor elements expediently have the same electrical potential. In other words, all of the n phases of the motor elements are guided with respect to a common star point, which has ground as the potential, for example. For example, in each case one of the n phases of one of the motor elements corresponds to one of the n phases of the other motor element. The corresponding phases may be arranged in a manner symmetrical here, in particular mechanically symmetrical, to one another, for example in a manner rotationally or point symmetrical with respect to an axis of rotation of the electric motor.

A converter, which corresponds to the number of phases of the electric motor, is used to operate the electric motor. In particular, the converter is what is known as a bridge converter with a number of bridge branches, which may be electrically connected in parallel with one another. The number of bridge branches of the converter may be equal to the (total) number of phases of the motor elements, in particular the number of phases of the electric motor, wherein each bridge branch may include two semiconductor switches, such as, for example, field-effect transistors (FETs), in particular MOSFETs. However, the number of bridge branches is at least in a functional relationship with respect to the number of phases of the motor elements. If each motor element has three phases, the converter may include six bridge branches and is what is known as a B12 converter. In the assembled state, the converter may be in electrical contact with an on-board power supply system of the motor vehicle, and the converter is expediently operated at a voltage of from a few volts up to 1000 volts, in particular at a voltage of 12 volts, 24 volts, 48 volts, 288 volts, 450 volts, 470 volts, 650 volts or 830 volts.

Switching points are determined for the n phases of one of the motor elements (first motor element) based on a power requirement. In other words, the times at which the semiconductor switches of the converter that are associated with the respective n phases of the motor element are actuated are determined. In particular, the period for which one of the n phases of the motor element conducts an electric current is determined. Second switching points are also determined for the n phases of the other motor element (second motor element) based on the power requirements.

The second switching points are therefore determined in a substantially corresponding manner to the ascertainment of the first switching points. In this case, the switching points of the two motor elements deviate from one another on account of the different geometric arrangement of the two motor elements and the configuration of a possible rotor of the electric motor. The second switching points are determined/ascertained, for example, based on the first switching points. Since the power requirement is used to determine the first switching points, however, the second switching points are therefore likewise determined based on the power requirement.

The second switching points are shifted by a first phase angle. In this case, the phase angle is determined, for example, the rotor or a space phasor of a current or of a voltage and may assume values between −180 degrees and +180 degrees, for example. The first phase angle may range between −90 degrees and +90 degrees. All of the second switching points may be shifted by the first phase angle, in particular with respect to the original position and/or with respect to the first switching points. In a further work step, the converter is actuated, in particular controlled, based on the first switching points and the second switching points. In other words, the semiconductor switches of the converter are activated in accordance with the first and the second switching points so that the phases of the two motor elements in accordance with the first switching points and the shifted second switching points are current-conducting or non-current-conducting.

The first phase angle may be selected in such a way that a flow of current across the converter is lower than a first limit value. In particular, the first phase angle may be selected in such a way that the resulting flow of current across the converter is lower than the value of the flow of current across the converter when the second switching points are not shifted by the first phase angle. The first limit value is therefore, for example, equal to the flow of current across the converter when the second switching points are not shifted. In other words, the first phase angle is selected in such a way that the flow of current across the converter is reduced upon actuation with the shifted second switching points and the first switching points. The first phase angle may be selected in such a way that the resulting flow of current across the converter represents a minimum, in particular a global, but at least a local, minimum. For example, an average flow of current or a maximum flow of current is reduced, wherein the maximum flow of current is directed, for example, from the converter to the electric motor or from the electric motor to the converter. As an alternative, a fluctuation of the flow of current is used as the flow of current, that is to say a deviation of the flow of current from an average value.

On account of the reduced flow of current across the converter, given the same power requirement, a loading of any electrical and/or electronic components of the converter and of the electric motor is reduced. Therefore, comparatively cost-effective components can be used, which lowers production costs. Also on account of the reduced loading of the components, a malfunction is unlikely, for which reason a reliability of the electric motor and of the converter is increased. In particular, the converter has an intermediate circuit capacitor, for example a number of such capacitors, which a return current from the electric motor to the converter is buffer-stored, for example. On account of the reduction of the flow of current across the converter, that is to say also a possible return current, loading of the intermediate circuit capacitors occurring on account of charging and/or discharging is reduced, which increases the lifetime thereof.

For example, the second switching points of all of the n phases of the other motor element are shifted by the same first phase angle. In a development of the method, in each case a first phase angle is associated with each of the n phases of the other motor element. In other words, n phase angles are determined, wherein, for example, the phase angles are different from one another. Consequently, it is made possible to reduce the flow of current across the converter further in order to therefore select a reduced first limit value. In other words, n degrees of freedom are present to reduce the flow of current.

The first switching points for the n phases of one of the motor elements are expediently shifted with respect to one another by a second phase angle. In other words, a second phase angle is associated with each of the n phase, in particular with the exception of one phases that expediently represents a reference. In this case, the second phase angle is selected in such a way that the resulting flow of current across the converter is lower than a second limit value upon actuation based on the shifted first switching points and the shifted second switching points. The second limit value is lower than the first limit value. In particular, both the first switching points are shifted with respect to one another and the second switching points are shifted with respect to one another and with respect to the first switching points. Consequently, a comparatively large number of degrees of freedom are available to reduce the flow of current, for which reason the first limit value and the second limit value can be selected to be comparatively low, which further reduces loading of the electric motor and of the converter. For example, a functional relationship exists between the first phase angle and the second phase angle and/or the first phase angles and/or the second phase angles with respect to one another, which simplifies the determination of the shifted first and second switching points.

For example, the first phase angle and/or the second phase angle or the first phase angles or the second phase angles may be ascertained by a theoretical model. The first phase angle is expediently determined based on a characteristic map. In this case, the converter has the characteristic map, for example. In the characteristic map, the first phase angle is expediently given depending on the power requirement. For example, the first phase angle is stored depending on further parameters of the converter and/or of the electric motor, for example a temperature and/or a rotational speed. The second phase angle or all of the first phase angles are expediently also stored in the characteristic map, if these are present. In this way, comparatively little computation outlay is required during operation of the electric motor in order to determine the phase angles. Ascertainment of the phase angles is also comparatively time-saving. For example, the shifted second switching points are already stored in the characteristic map depending on the power requirement, which further reduces computational outlay. As an alternative or in combination therewith, the first switching points are also stored in the characteristic map depending on the power requirement.

The first phase angle or the first phase angles and/or the second phase angle or angles may be determined iteratively. An optimization algorithm is expediently used for this purpose. In other words, first the first phase angle is changed and the resulting flow of current is ascertained. If the resulting flow of current is reduced and/or lower than the first limit value, the changed angle is used, for example, as the first phase angle. The angle is expediently changed until a minimum of the flow of current is found or until the flow of current is lower than the first limit value. The first phase angle may be changed in fixed steps. For example, the phase angle is changed by an absolute value of between 5 degrees and 30 degrees, between 10 degrees and 20 degrees and, for example, by 15 degrees. In other words, the phase angle is changed in 15-degree steps and the resulting flow of current is determined. In this way, a minimum is reached after comparatively few steps. For example, the minimum is found after approximately 10 milliseconds, which corresponds to approximately 10 revolutions of the electric motor in the case of a rotational speed of 8000 revolutions per minute.

In summary, first the second switching points are shifted by an auxiliary phase angle and the resulting flow of current is determined. If the flow of current is reduced, the second switching points are shifted again by the auxiliary phase angle. This takes place until a rise in the flow of current is ascertained. In this case, the last shift is reversed and said second switching points are used to actuate the converter. Consequently, the first phase angle corresponds to an integer multiple of the auxiliary phase angle. If the flow of current is increased in the case of the first shift, the second switching points may be shifted in the other direction by in each case the auxiliary phase angle until a rise in the flow of current is detected again.

The first phase angle is expediently determined again when the power requirement is changed. Therefore, a first phase angle is determined for each power requirement so that at each power requirement the flow of current is in each case lower than the first limit value. In this case, for example, a first limit value is associated with each power requirement. As an alternative thereto, the first limit value is constant or at least independent of the power requirement. For example, the first limit value is stored in the characteristic map, if this is used. As an alternative thereto, a further characteristic map is present, by means of which the first limit value is ascertained.

For example, the non-shifted second switching points correspond to the phase-shifted first switching points. In this case, the non-shifted second switching points are offset, for example, by 180 degrees with respect to the first switching points. The angle is determined, for example, electrically or mechanically. In this way, the second switching points can be determined in a comparatively time-saving manner. For this purpose, the two motor elements are expediently positioned with respect to one another in a suitable manner. In an alternative thereto, the non-shifted second switching points correspond to the inverted and phase-offset first switching points. In other words, a switch-on of one of the phases of one of the motor elements corresponds to the switch-off of the corresponding phase of the other motor element and vice versa. The switching points are expediently phase-offset with respect to one another in such a way that an axis of symmetry between two temporally adjacent switching points of each of the phases of one of the motor elements is offset, in particular, by 180 degrees with respect to the axis of symmetry of the corresponding switching points of the other motor element. For this purpose, the n phases of the other motor element are expediently rotated electrically by 180 degrees with respect to the n phases of one of the motor elements. On account thereof, only the n phases of one of the motor elements therefore has to be calculated based on the power requirement, and the second switching points can be determined based on the first switching points, wherein these correspond to the power requirement.

For example, the first switching points are discarded when a fault is determined on one of the motor elements. In other words, the first switching points are erased when the fault is detected on one of the motor elements. Therefore, one of the motor elements is not actuated further if a fault is detected therein, with the result that an amplification of the fault or damage to further components of the electric motor and/or of the converter is essentially excluded. The converter is therefore actuated based only on the second switching points. On account thereof, although the power of the electric motor is reduced, operation can be maintained. In particular, if the electric motor is a constituent part of an electromotive refrigerant compressor, a maximum power is required comparatively seldom. On account of the partial operation by means of the other motor element, however, a cooling power, even though it is limited, is still present, with the result that the motor vehicle can continue to be operated.

For example, the second switching points are ascertained again, wherein the fact that one of the motor elements is not operated is taken into account. Consequently, the electric motor is operated only by means of the other motor element at the power requirement.

Alternatively, the second switching points are discarded/erased when a fault is determined/detected in the other motor element. Therefore, the converter or the electric motor is operated only based on the first switching points and the other motor element is essentially shut down. In particular, the first switching points are ascertained again, wherein the fact that the other motor element is not operated is taken into account. Consequently, an emergency operation program is present, for which reason a reliability of the electric machine is increased. When the switching points are erased, the converter is expediently actuated in such a way that the n phases of the motor element having the fault are non-current-conducting.

The unit is a constituent part of a motor vehicle and serves, for example, to drive the motor vehicle and is therefore a main unit of the motor vehicle. However, the unit may be an ancillary unit of the motor vehicle, such as an electromotive adjustment drive or another electric drive. The electromotive adjustment drive is expediently an electromotively operated door, such as a sliding door. As an alternative, the adjustment drive is an electromotive window lifter, an electromotively operated sunroof or an electromotively operated top. In a further alternative, the ancillary unit is a lubricant or water pump. The unit may be an electromotive refrigerant compressor, by means of which a refrigerant is compressed during operation. For this purpose, the electromotive refrigerant compressor may include a compressor head, for example a scroll compressor head. The unit may include a brushless electric motor comprising two motor elements, which are arranged in sections. The motor elements form, in particular, a stator of the electric motor. The motor elements expediently do not comprise a separate rotor and are consequently rotorless. In this case, the electric motor may include a single rotor, associated with the two motor elements.

Each of the motor elements may include in each case n phases, wherein the number of n phases of the two motor elements is, for example, different or equal. The unit also has a converter corresponding to the number of n phases of the electric motor. In particular, the converter is a bridge converter, and the number of bridge branches of the converter is equal to the total number of n phases of the electric motor. For operation, first switching points are first determined for the n phases of one of the motor elements based on a power requirement and second switching points are determined for the n phases of the other motor element based on the power requirement. The second switching points are shifted by a first phase angle, and the converter is actuated based on the first switching points and the second switching points, wherein the first phase angle is selected in such a way that a resulting flow of current across the converted is lower than a first limit value.

The developments and advantages described in connection with the method can also be applied analogously to the unit and vice versa.

BRIEF DESCRIPTION OF THE DRAWINGS

The invention is explained in more detail below with reference to a drawing, in which.

Mutually corresponding parts are provided with the same reference signs in all of the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
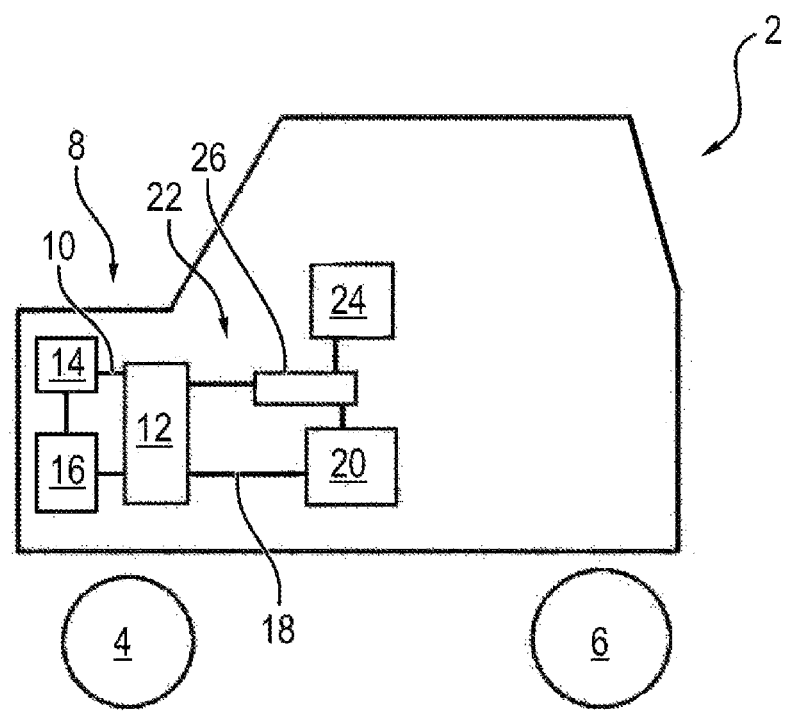
FIG. 1 schematically shows a motor vehicle comprising an electromotive refrigerant compressor.

FIG. 1 illustrates a motor vehicle 2 comprising two front wheels 4 and two rear wheels 6 in a schematically simplified manner. At least two of the wheels 4, 6 are driven by means of a main drive (not shown in more detail), for example an internal combustion engine, an electric motor or a combination thereof. The motor vehicle 2 may include a refrigerant circuit 8, which is a constituent part of an air-conditioning system. The refrigerant circuit 8 is filled with a refrigerant 10, for example CO2, R1234yf or R134a. The refrigerant 10 is compressed by means of an electromotive refrigerant compressor (eKMV) 12 and fed to a condenser 14, which is fluidically connected downstream and has ambient air supplied to it, which leads to a drop in the temperature of the refrigerant 10. The pressure and therefore the temperature of the refrigerant 10 is lowered by means of a downstream evaporator 16, which may include a further heat exchanger (not illustrated in more detail), which is thermally coupled to a fan line of the air-conditioning system. The fan line conveys air, which is cooled depending on a user setting, into an interior of the motor vehicle 2.

The electromotive refrigerant compressor 12 is coupled in terms of signaling to a motor vehicle controller 20, such as an on-board computer, by means of a bus system 18, which is a CAN bus system or a LIN bus system. The electromotive refrigerant compressor 12 is energized by means of an on-board power supply system 22, which carries the respective voltage, for example 48 V, and is fed by means of a battery 24. The on-board power supply system 22 also may include a safety device 26, by means of which a flow of electric current between the battery 24 and the refrigerant compressor 12 can be suppressed. For this purpose, the safety device 26 has a load break switch and/or circuit breaker, for example. The safety device 26 is connected in terms of signaling to the motor vehicle controller 20 by means of the bus system 18 or in some other way so that the load break switch or circuit breaker is activated by means of the motor vehicle controller 20 and therefore the flow of electric current can be suppressed.

Figure 2:
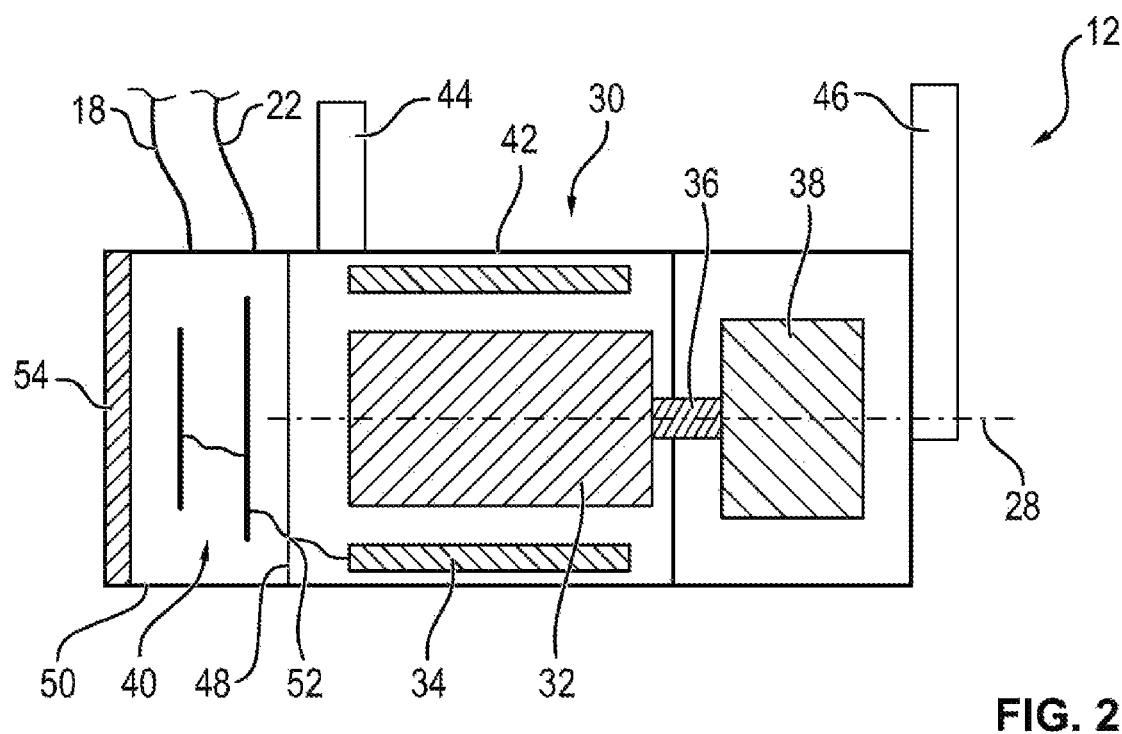
FIG. 2 shows in a schematically simplified manner a sectional illustration of the electromotive refrigerant compressor, FIG. 3 schematically shows the electromotive refrigerant compressor comprising a converter and two motor elements.

FIG. 2 shows in a schematically simplified manner a sectional illustration of the electromotive refrigerant compressor 12 along an axis of rotation 28 of a brushless electric motor 30 of the refrigerant compressor 12. The (brushless) electric motor 30 has a cylindrical rotor 32, which is surrounded peripherally by means of a hollow-cylindrical stator 34. The rotor 32 is mounted by means of a shaft 36 so as to be able to rotate about the axis of rotation 28. A compressor head 38, for example a scroll compressor, is connected in a manner secured against rotation to the free-end side of the shaft 36. The electric motor 30 is energized by means of an electronics system 40, which is connected to the bus system 18 and to the on-board power supply system 22.

The electric motor 30, the compressor head 38 and the electronics system 40 are arranged in a housing 42 composed of pressure-cast aluminum, said housing having a substantially hollow-cylindrical shape and being concentric to the axis of rotation 28. The housing 42 may include an inflow 44 via which the refrigerant 10 enters the housing 42 and is suctioned along the electric motor 30 to the compressor head 38, by means of which the pressure is increased. The refrigerant 10 that is compressed by means of the compressor head 38 is conveyed out of the housing 34 by means of an outflow 46.

The housing 42 may include a separating wall 48, by means of which an electronics system housing 50 is separated off from the part of the housing 42 through which the refrigerant 10 flows. The electronics system 40 is arranged inside the electronics system housing 50. The separating wall 48 has a via 52, which is pressure-sealed, and by means of which the stator 34 is energized. On the side opposite to the separating wall 48 in the axial direction, that is to say parallel to the axis of rotation 28, the electronics system housing 50 may include a housing cover 54, which is produced from a metal, is secured in a releasable manner to further constituent parts of the electronics system housing 50 by means of screws and closes an opening of the electronics system housing 50.

Figure 3:
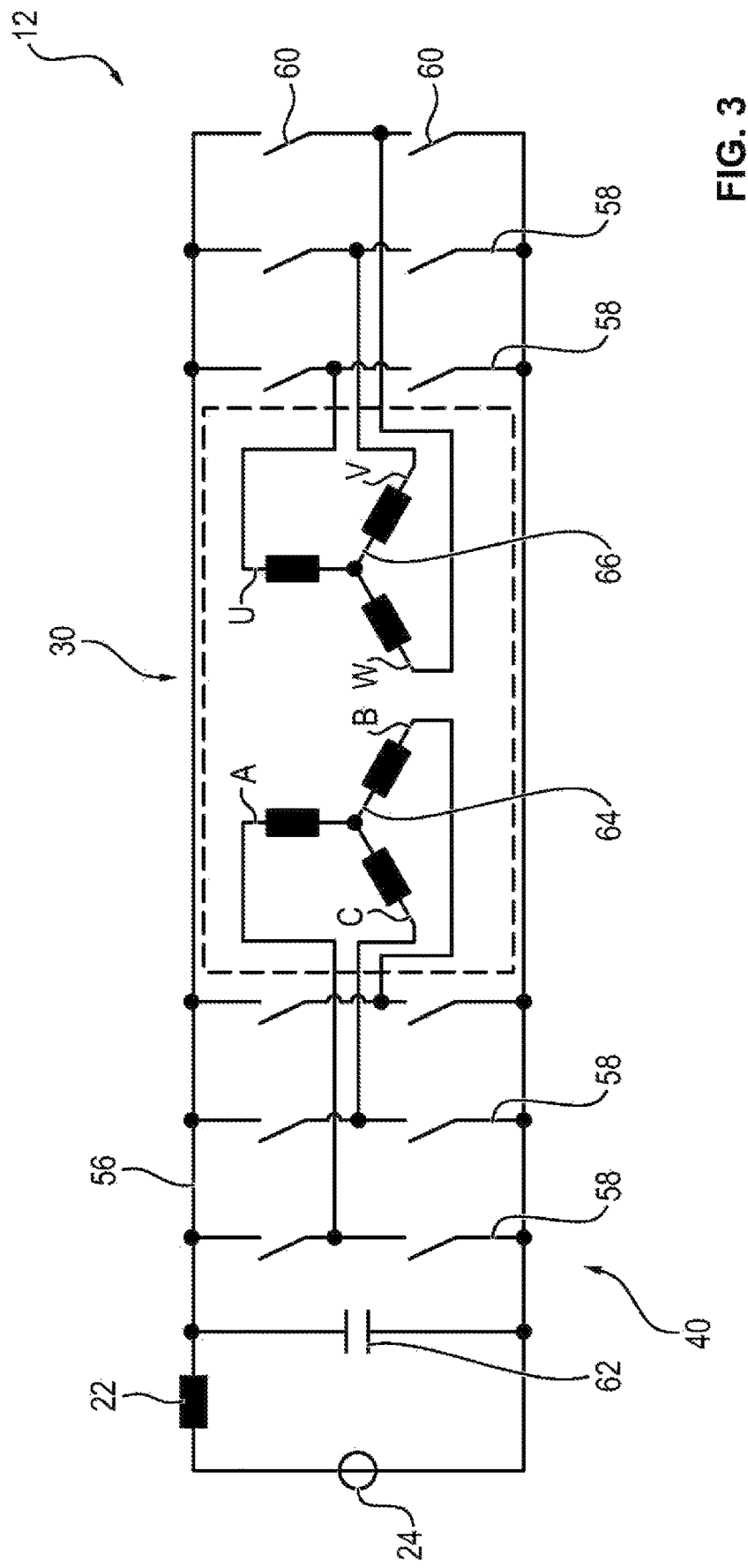

FIG. 3 schematically shows the electromotive refrigerant compressor 12. The electronics system 40 has a converter 56 comprising six bridge branches 58, which are connected in parallel with one another and which each comprise two semiconductor switches 60. The converter 56 is therefore a B12 converter. An intermediate circuit capacitor 62 is connected in parallel with the bridge branches 58. The converter 56 is in electrical contact with the battery 24 by means of the on-board power supply system 22 so that the voltage of the battery 24 is applied to the intermediate circuit capacitor 62. The electric motor 30 has two motor elements 64, 66. In this case, one of the motor elements 64 (first motor element) has three phases A, B, C. The other motor element 66 (second motor element) likewise has three phases U, V, W. Consequently, the electric motor 30 has exactly as many phases A, B, C, U, V, W as the converter 56 may include bridge branches 58. The phases A, B, C, U, V, W of the two motor element 64, 66 are in each case in electrical contact with one another in a star circuit, wherein the two star points of the two motor element 64, 66 are at the same electrical potential.

Figure 4:
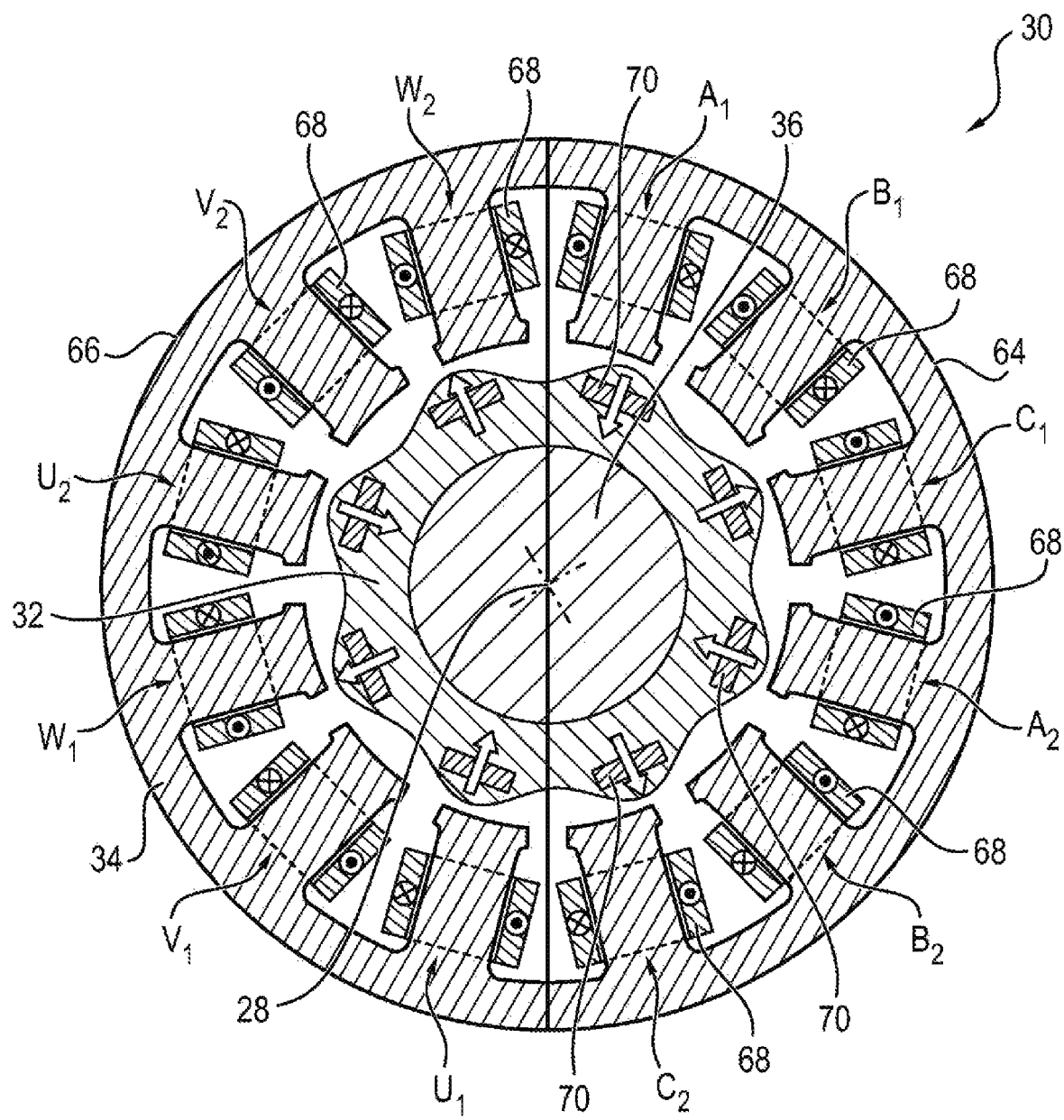
FIG. 4 shows a sectional illustration of the brushless electric motor.

FIG. 4 shows a sectional illustration of the electric motor 30 perpendicular to the axis of rotation 28. The two motor elements 64, 66 substantially form the stator 34 and are arranged in sections. Consequently, each of the motor elements 64, 66 is substantially configured in the shape of a half-moon, and in each case substantially 180° of the circumference of the rotor 32 are contiguously surrounded peripherally either by the first or the second motor element 64, 66. Each of the phases A, B, C, U, V, W has in each case two electrical coils 68, which are offset from one another by 90° with respect to the axis of rotation 28. As a result of this, a coupling between one of the coils 68 of the second motor element 66, namely W2, and one of the coils of one of the phases of the first motor element 64, namely A1, as well as of the coil U1 and C2 is changed in comparison to the other couplings, for which reason the electric motor 30 does not have a rotationally symmetrical design at an angle of rotation of 90°. In summary, the electric motor 30 has a total of twelve electrical coils 68, of which in each case six are associated with each of the motor elements 64, 66. In this case, two electrical coils 68 are associated in each case with each of the phases A, B, C, U, V, W of the respective motor element 64, 66, and the electrical coils 68 that are associated with one another are offset from one another in each case by 90° with respect to the axis of rotation 28. The rotor 32 may include eight permanent magnets 70, which are radially magnetized, wherein the magnetization direction is different between adjacent permanent magnets 70.

Figure 5:
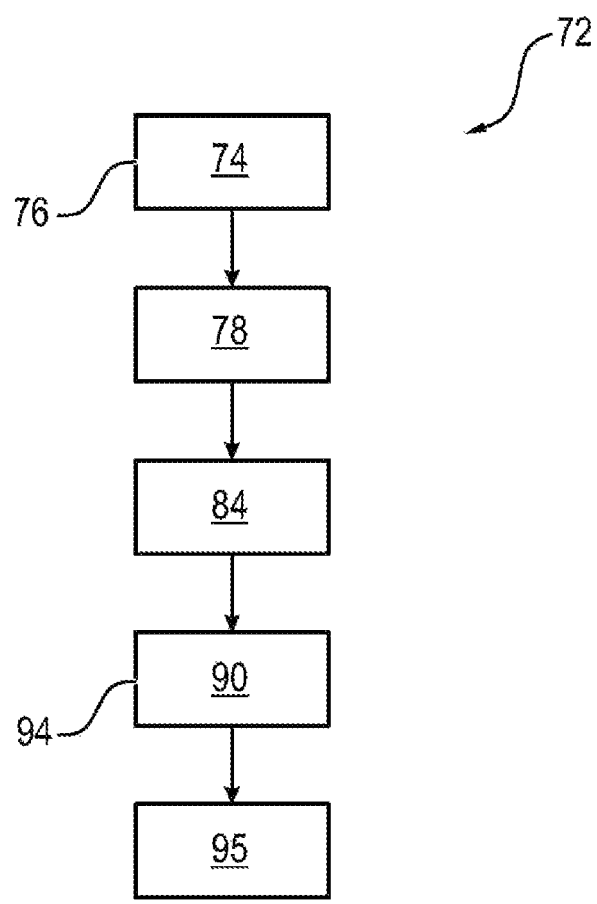
FIG. 5 shows a method for operating the brushless electric motor.

FIG. 5 shows a method 72 for operating the electric motor 30 by means of the converter 56. In a first work step 74, a power requirement 76 of the electric motor 30 is determined.

The power requirement 76 is provided, for example, by means of the motor vehicle controller 20. In a second work step 78, which takes place, for example, at the same time as the first work step 74, first switching points 80 are determined for the three phases A, B, C of the first motor element 64 based on the power requirements 26. The first switching points 80 correspond here to the actuations of the semiconductor switches 60 of the bridge branches 58 of the converter 56, which are in electrical contact with the three phases A, B, C of the first electric motor 64. At each of the switching points 80, the switching state of at least one of the semiconductor switches 60 is changed so that, between adjacent first switching points 80 of each of the phases A, B, C, a flow of current through the respective phase A, B, C either takes place or is suppressed.

Figure 6:
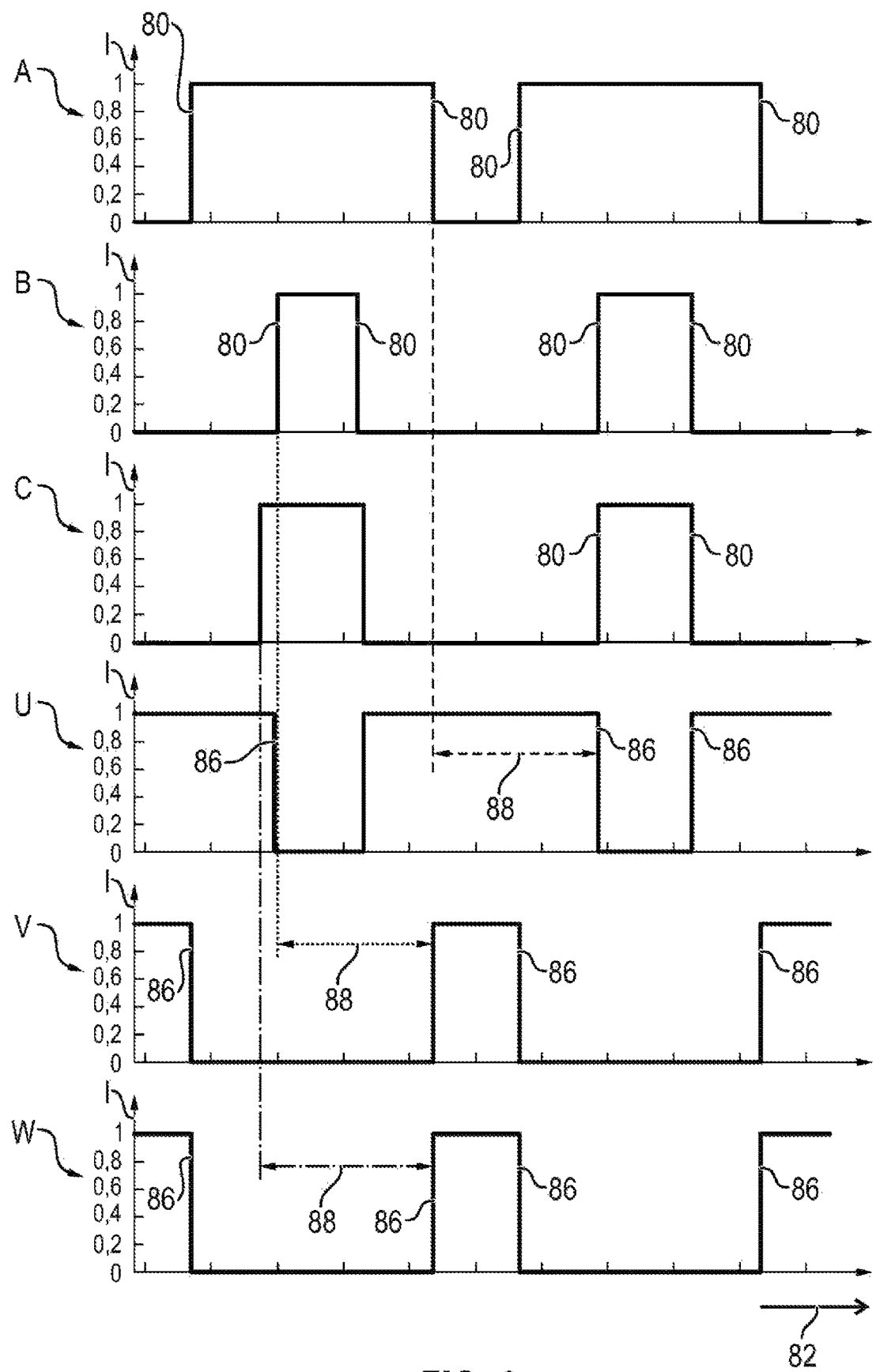
FIGS. 6-9 show switching points for phases of the brushless electric motor.
Figure 7:
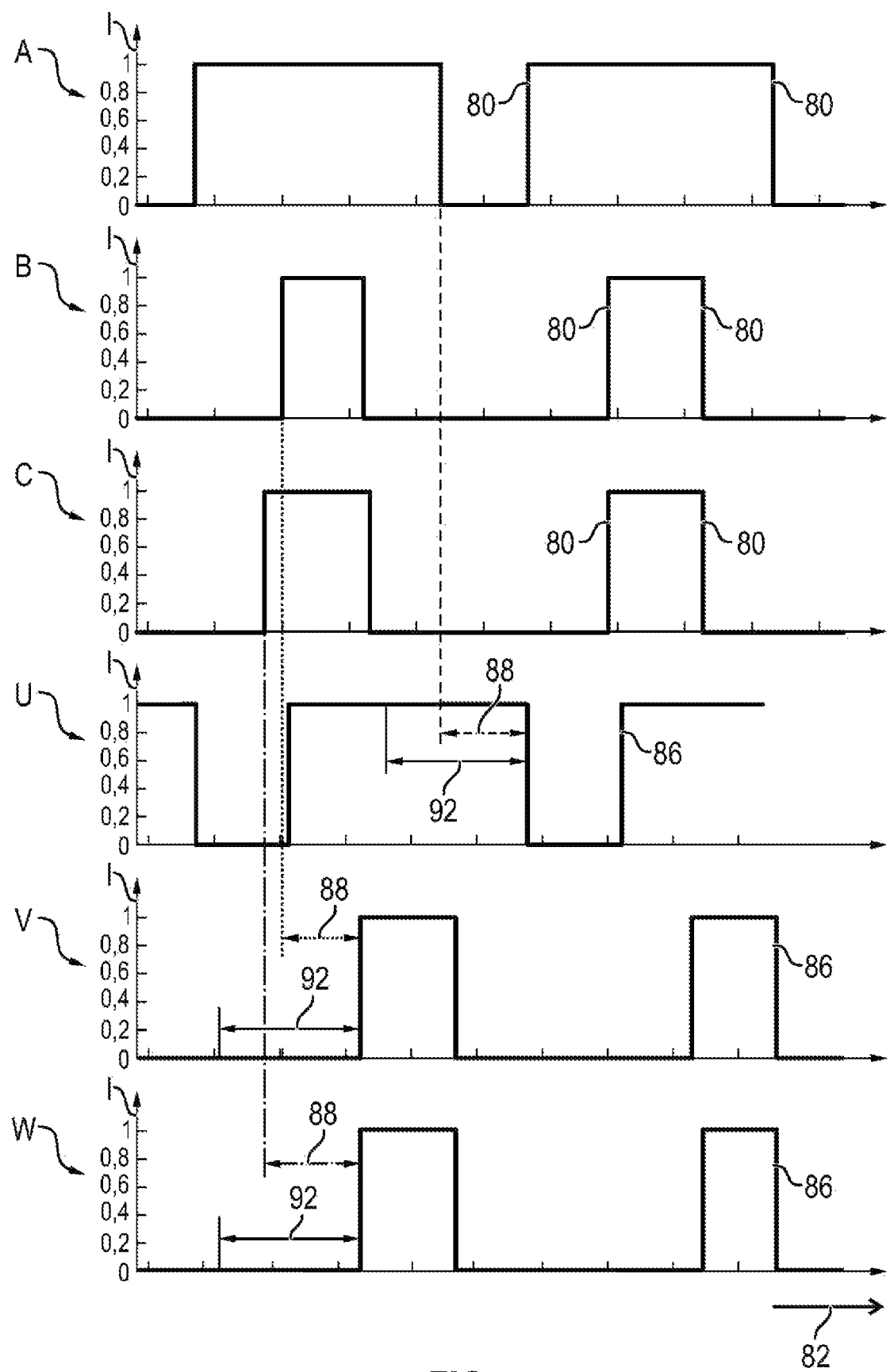
Figure 8:
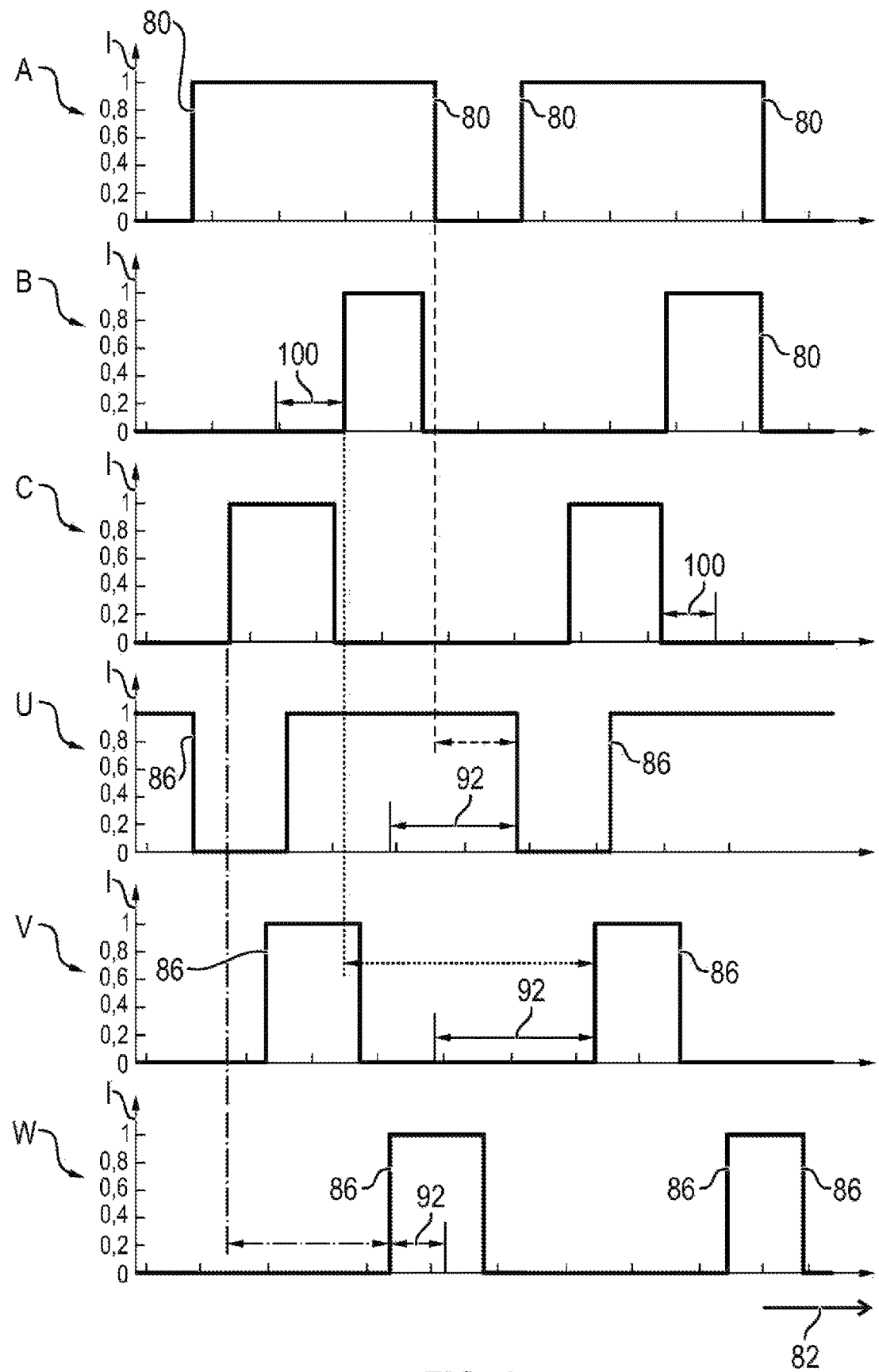

FIG. 6 illustrates this by way of example, wherein the first switching points 80 are shown as a function of an actuation angle 82, which denotes, for example, the position of the rotor 32 with respect to the stator 64 or the angle between a current space phasor and the stator 34. The three phases A, B, C are in this case illustrated beneath one another and each of the three phases A, B, C can assume two states, namely in one case the current-conducting or the non-current-conducting state, wherein the two states are each separated from one another by means of one of the first switching points 80. In this case, for example, the top state symbolizes current conduction and the bottom state symbolizes the state of the respective phase A, B, C in which a flow of current is blocked.

In a third work step 84, second switching points 86 are determined for the phases U, V, W of the second motor element 66 based on the power requirement 76, said second switching points likewise being shown in FIG. 6. In this case, phase U corresponds to phase A, phase V corresponds to phase B and phase W corresponds to phase C of the two motor elements 64, 66. In other words phases A, B, C, U, V, W, which are arranged in a manner mirror-symmetrical with respect to the axis of rotation 28, correspond to one another. The second switching points 86 correspond to the first switching points 80, which are offset by a shift angle 88. The shift angle 88 is in this case 180°, with the result that the phases A, B, C, U, V, W, which are offset from one another by the mechanical angle with respect to the axis of rotation 28, are likewise offset from one another electrically by the shift angle 88, namely 180°.

In a fourth work step 90, the second switching points 86 are shifted by a first phase angle 92. As a result thereof, the shift angle 88 between the first switching points 80 and the second switching points 86 is changed and, for example, reduced to 100°, for example. The first phase angle 92 is determined, in particular, based on a characteristic map 94, which is expediently stored in a memory of the electronics system 40. The characteristic map 94 is ascertained, for example, during manufacture of the electromotive refrigerant compressor 12 on a test stand or created by means of a theoretical model. In a subsequent fifth work step 95, the converter 56 is actuated based on the first switching points 80 and the (shifted) second switching points 86, that is to say the semiconductor switches 60 are activated in accordance with the switching points 80, 86.

Figure 10:
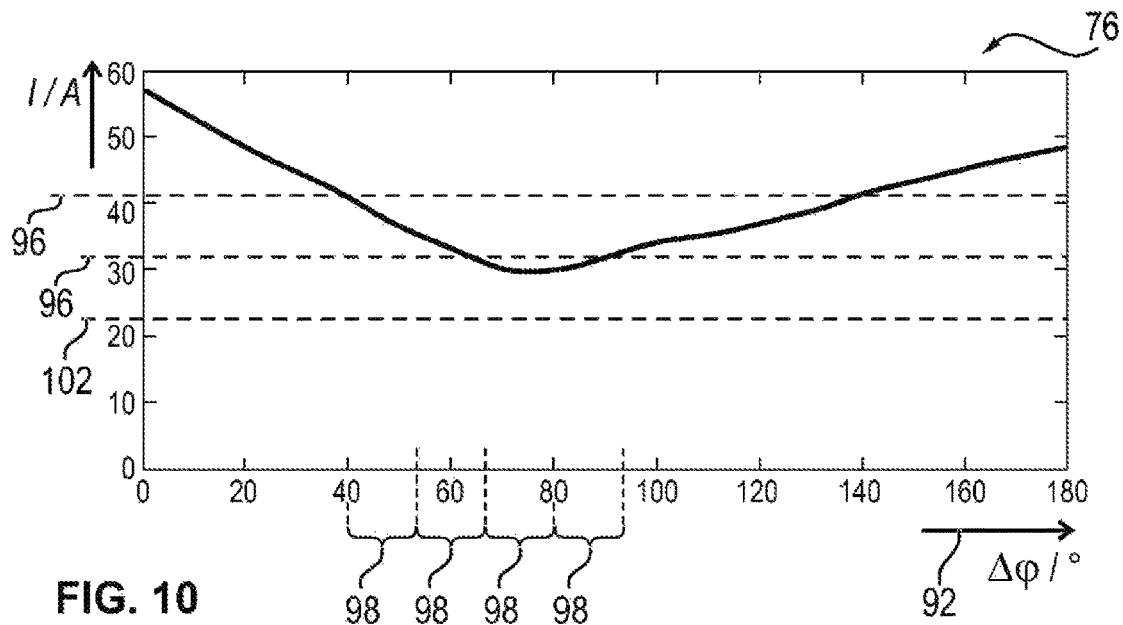
FIG. 10 shows a resulting flow of current across the converter in the case of a power requirement.

The first phase angle 92 is selected in such a way that a resulting flow of current I across the converter 56 is lower than a first limit value 96, which is illustrated in FIG. 10. In this case, the flow of current I across the converter 56 is illustrated as a function of the first phase angle 92 in the case of the power requirement 76. For example, the first limit value 96 is set to a value just above the arbitrary unit 40. As a result thereof, all of the components of the electronics system 40 are only loaded with this arbitrary value at the most, for which reason components adjusted thereto can be used, which saves production costs. In an alternative thereto, the first limit value 96 is selected just above the minimum so that, upon actuation of the converter 56, only a minimum of the flow of current I across the converter 56 takes place.

In a further alternative, instead of the characteristic map 94, the first phase angle 92 is determined iteratively. In this case, the first phase angle 92 is changed, for example, in fixed steps 98 of, in particular, 15 degrees. Thus, for example, starting at an arbitrary angle of 35 degrees, the angle is increased by the step 98 to 50 degrees and the resulting flow of current I is ascertained. Since said flow of current is lower, the angle is increased again by the step 98 to 65 degrees. The resulting flow of current I is lower than the limit value 96, with the result that this angle is used as the first phase angle 92.

In a modified variant of the method, in the fourth work step 90, in each case a first phase angle 92 is associated with each of the phases U, V, W of the second motor element 66 so that the second switching points 86 are also shifted with respect to one another. As an alternative thereto or in combination therewith, the phases A, B, C of the first motor element 64 are likewise shifted with respect to one another by a second phase angle 100. In this case, for example, the first switching points 80 of one of the first phases A of the first motor element 64 are left unchanged and the further phases B, C of the first motor element 64 are shifted by the second phase angle 100. A different second phase angle 100 is expediently associated with each of the phases B, C to be shifted. The second phase angle 100 is selected here in such a way that the resulting flow of current I across the converter 56 is lower than a second limit value 102, which is, in particular, lower than the first limit value 96. On account of the second phase angle 100, the flow of current I can be reduced further so that the second limit value 102 shown in FIG. 10 is also undershot by means of flow of current I in the case of the same power requirement 76.

Figure 9:
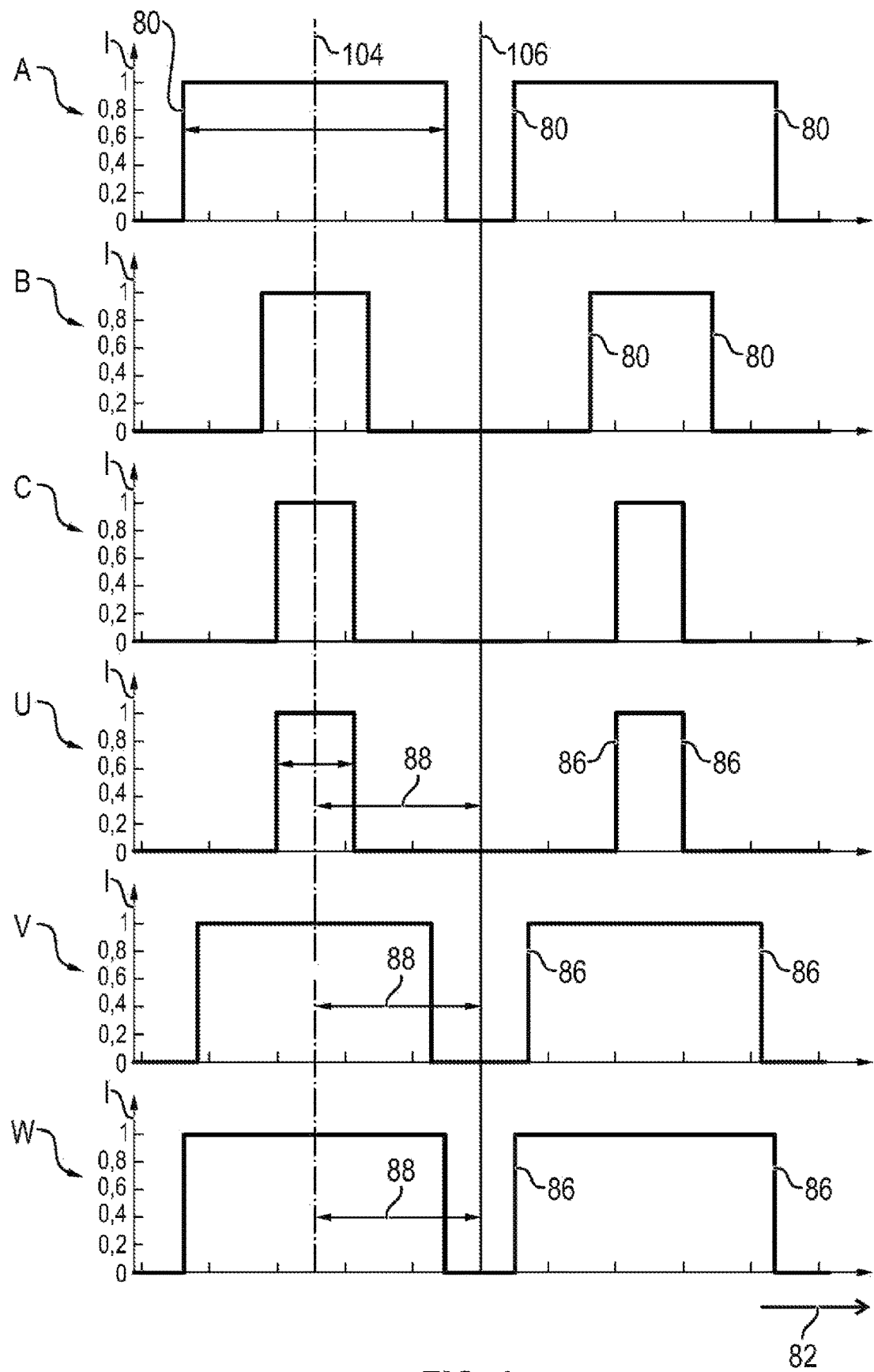

FIG. 9 shows in the (non-shifted) first switching points 80 and the (non-shifted) second switching points 86 for an altered electric motor 30. In this case, the individual coils 68 of the two motor elements 64, 66 are not wound equally but are wound in a manner rotated by 180 degrees. The second switching points 86 correspond to the inverted first switching points 80, which are phase-offset. The phase offset is such that the center points of the time intervals of the current conduction of all of the phases A, B, C, U, V, w are effected at a first angle of symmetry 104 and in that all of the center points of the intervals of no current conduction take place at a second angle of symmetry 106. The two angles of symmetry 104, 106 are shifted by the shift angle 88 of 180 degrees. During the fourth work step 90, the first angle of symmetry 104 and the second angle of symmetry 106 of the respective phases B, C, U, V, W are shifted.

Figure 11:
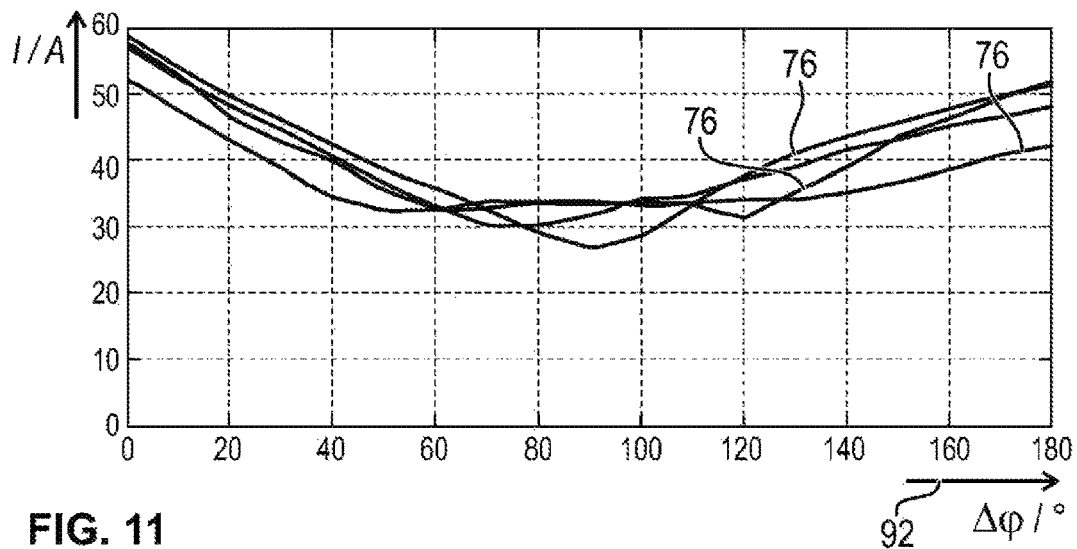
FIG. 11 shows resulting flows of currents in accordance with FIG. 10 in the case of different power requirements.

When the power requirement 76 is changed, the second, third, fourth and fifth work step 78, 84, 90, 95 are executed again. In other words, the first phase angle 92 is determined again. FIG. 11 shows the flows of current I across the converter 56 produced in the case of different power requirements 76. The minimum is different according to the power requirement 76, for which reason a first limit value 26 adapted thereto can be selected to be different.

Figure 12:
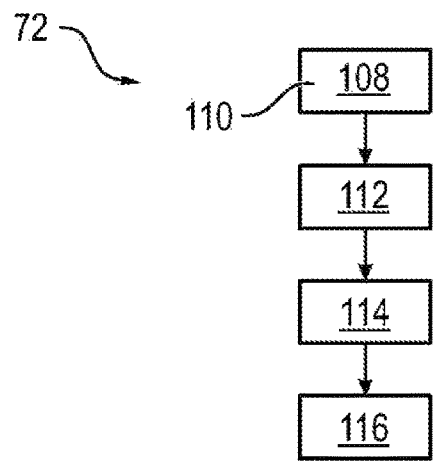
FIG. 12 shows a development of the method in accordance with FIG. 5.

FIG. 12 illustrates a development of the method 72. In a sixth work step 108, which takes place substantially independently of the first, second, third, fourth and fifth work step 74, 78, 84, 90, 95, a fault 110 is determined in the first motor element or in the second motor element 66. The fault 110 corresponds, for example, to a short circuit of one of the phases A, B, C, U, V, W of the first or of the second motor element 64, 66. In an adjoining seventh work step 112, the first switching points 80 are discarded when the fault 110 relates to the first motor element 64. When the fault 110 relates to the second motor element 66, in contrast, the second switching points 86 are discarded. In other words, the respective switching points 80, 86 are erased.

In an adjoining eighth work step 114, the converter 56 is actuated either only by means of the first switching points 80 or by means of the second switching points 86, with the result that the motor element 64, 66 in which the fault 110 has been detected is not actuated. In this case, the semiconductor switches 60 that are associated with said motor element 64, 66 are blocked so that no flow of current I is effected across said motor element. As a result thereof, although a maximum power of the electric motor 30 is reduced, an emergency operation program is present. In a further alternative, in addition to erasing the second switching points 86, the first switching points 80 are adapted so that the power requirement 76 can still be fulfilled by means of the electric motor 30 during operation only of the first motor element 64 if the fault 110 is present in the second motor element 66. In this alternative, if the fault 110 is present in the first motor element 64, the first switching points 80 are erased. The second switching points 86 are also adapted so that the power requirement 76 is fulfilled by means of the second motor element 66.

In an adjoining ninth work step 116, the fault 110 is stored inside a memory of the electronics system 40 or said fault is transmitted to the motor vehicle controller 20 by means of the bus system 18. In this case, for example, the failure of one of the motor elements 64, 66 is indicated to the driver of the motor vehicle 20 by means of a signal light. In an alternative, the fault 110 is only stored in a memory of the motor vehicle controller 20 so that the fault 110 can be read out in the case of upcoming maintenance in a workshop.

The invention is not restricted to the exemplary embodiments described above. Instead, other variants of the invention can also be derived therefrom by the person skilled in the art without departing from the subject matter of the invention. In particular, all of the individual features described in connection with the individual exemplary embodiments can furthermore also be combined with one another in another way without departing from the subject matter of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

2 Motor vehicle
4 Front wheel
6 Rear wheel
8 Refrigerant circuit
10 Refrigerant
12 Electromotive refrigerant compressor
14 Condenser
16 Evaporator
18 Bus system
20 Motor vehicle controller
22 On-board power supply system
24 Battery
26 Safety device
28 Axis of rotation
30 Brushless electric motor
32 Rotor
34 Stator
36 Shaft
38 Compressor head
40 Electronics system
42 Housing
44 Inflow
46 Outflow
48 Separating wall
50 Electronics system housing
52 Via
54 Housing cover
56 Converter
58 Bridge branch
60 Semiconductor switch
62 Intermediate circuit capacitor
64 First motor element
66 Second motor element
68 Electric coil
70 Permanent magnet
72 Method
74 First work step
76 Power requirement
78 Second work step
80 First switching point
82 Actuation angle
84 Third work step
86 Second switching point
88 Shift angle
90 Fourth work step
92 First phase angle 94 Characteristic map
95 Fifth work step
96 First limit value
98 Step
100 Second phase angle
102 Second limit value
104 First angle of symmetry
106 Second angle of symmetry
108 Sixth work step
110 Fault
112 Seventh work step
114 Eighth work step
116 Ninth work step
A, B, C Phases of the first motor element
U, V, W Phases of the second motor element
I Flow of current

The invention claimed is:

1. A method of operating a brushless electric motor for a motor vehicle, including an electromotive refrigerant compressor, including a first motor element and a second motor element arranged in sections and including a number of phases by means of a converter corresponding to the number of phases, the method comprising:
   determining first switching points for the number of phases of one of the first motor element or the second motor element based on a power requirement;
   determining second switching points for the number of phases of the other motor element based on the power requirement;
   shifting the second switching points by a first phase angle;
   actuating the converter based on the first switching points and the second switching points; and
   selecting the first phase angle such that a first resulting flow of current across the converter is less than a first limit value, wherein the selecting step includes determining the first phase angle in response to a change in the power requirement.

2. The method of claim 1, wherein the first phase angle is associated with each of the number of phases of the other motor element.

3. The method of claim 2, further comprising shifting the first switching points for the number of phases of one of the motor elements with respect to one another by a second phase angle, wherein the second phase angle is selected such that a second resulting flow of current across the converter is lower than a second limit value.

4. The method of claim 3, wherein the selecting step includes reading a characteristic map.

5. The method of claim 1, wherein the selecting step includes iteratively determining the first phase angle.

6. The method of claim 5, wherein iteratively determining the first phase angle includes increasing and/or decreasing the first phase angle in fixed steps.

7. The method of claim 1, wherein non-shifted second switching points correspond to the phase-offset first switching points or to a phase-offset, inverted first switching points.

8. The method of claim 1, further comprising discarding the first switching points in response to determining a fault in one of the motor elements.

9. A unit for a motor vehicle, including an electromotive refrigerant compressor, including a brushless electric motor, the unit comprising:
   two motor elements arranged in sections and each including a number of phases; and
   a converter corresponding to the number of phases, wherein the unit is operated in accordance with the method of claim 1.

10. An electromotive refrigerant compressor comprising:
   an electric motor including:
      a first motor element arranged in sections and provided with a first number of phases,
      a second motor element arranged in sections and provided with a second number of phases, and
      a converter; and
   a controller configured to:
      responsive to receiving a power requirement, determine first switching points for each of the first number of phases of the first motor element, determine second switching points for each of the second number of phases of the first motor element and shifting the second switching points by a first phase angle, and
      select the first phase angle such that a first resulting flow of current across the converter is less than a first limit value, wherein the first phase angle is based on the second number of phases.

11. The electromotive refrigerant compressor of claim 10, wherein the controller is further configured to actuate the converter based on the first switching points and the second switching points.

12. The electromotive refrigerant compressor of claim 10, wherein the first phase angle is based on a characteristic map.

13. The electromotive refrigerant compressor of claim 10, wherein the controller is further configured to iteratively increase and/or decrease the first phase angle over a period.

14. The electromotive refrigerant compressor of claim 10, wherein the controller is further configured to, responsive to shifting the second switching points, shift the first switching points for the first number of phases by a second phase angle.

15. The electromotive refrigerant compressor of claim 10, wherein the controller is further configured to, responsive to receiving a fault from the first motor element, discard the first switching points.

16. The electromotive refrigerant compressor of claim 10, wherein the controller is further configured to, responsive to receiving a fault from the second motor element, discard the second switching points.

17. A method of operating a brushless electric motor for a motor vehicle, including an electromotive refrigerant compressor, including a first motor element and a second motor element arranged in sections and including a number of phases, by means of a converter corresponding to the number of phases, the method comprising:
   determining first switching points for the number of phases of one of the first motor element or the second motor element based on a power requirement;
   determining second switching points for the number of phases of the other motor element based on the power requirement;
   shifting the second switching points by a first phase angle;
   actuating the converter based on the first switching points and the second switching points;
   selecting the first phase angle such that a first resulting flow of current across the converter is less than a first limit value; and
   discarding the second switching points in response to determining a fault in the other motor element.

18. The method of claim 17, wherein the first phase angle is associated with each of the number of phases of the other motor element.

19. The method of claim 17, further comprising discarding the first switching points in response to determining a fault in one of the motor elements.

20. The method of claim 17, wherein the selecting step includes reading a characteristic map.

* * * * *